(No Model.)
D. W. BOVEE.
HAY LOADER.
No. 352,604. Patented Nov. 16, 1886.
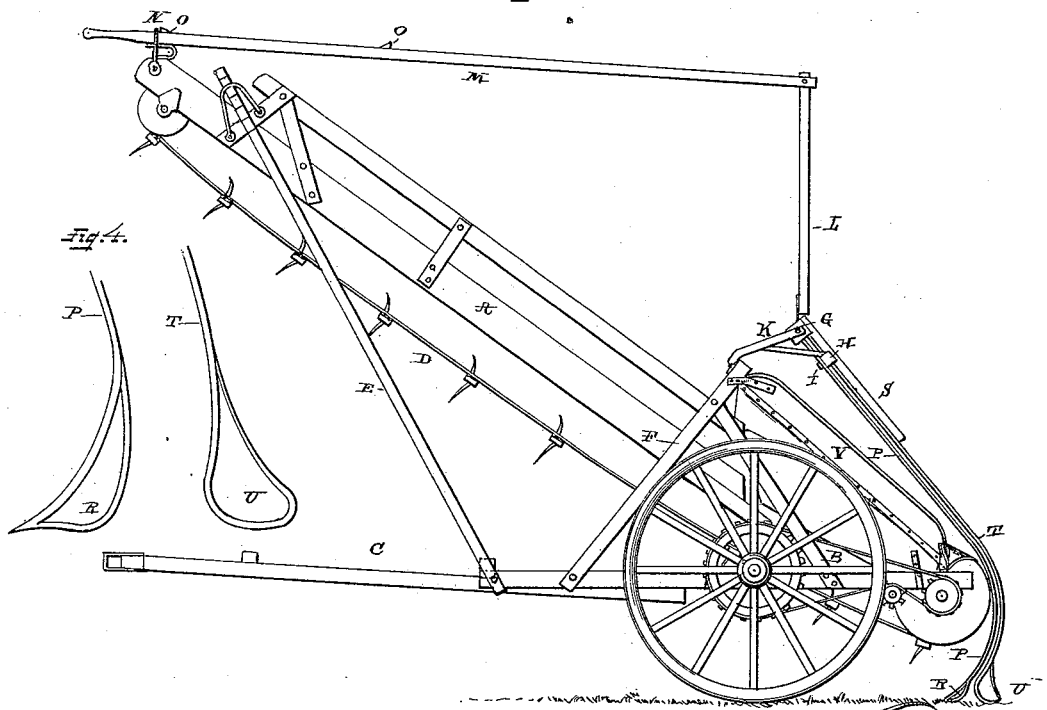
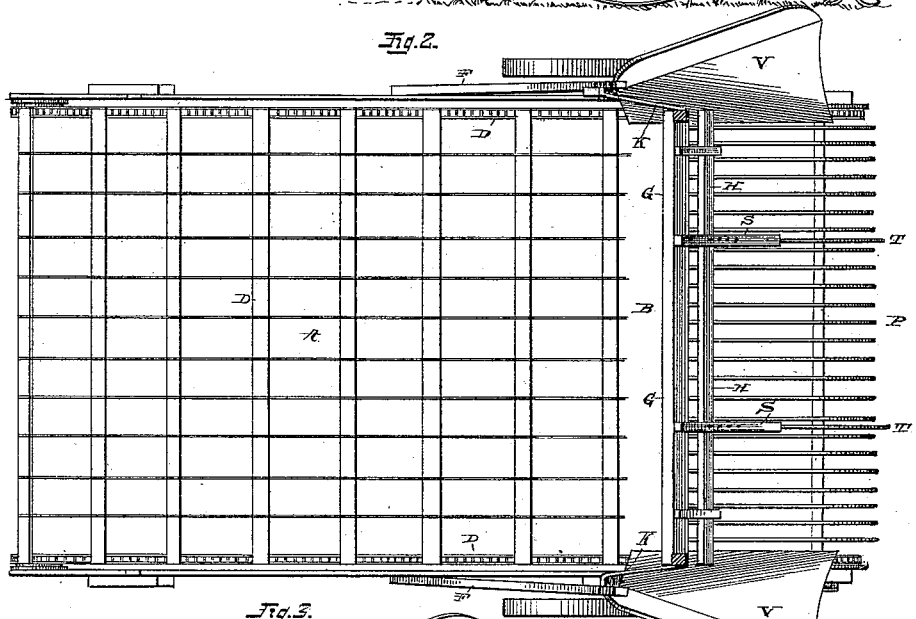
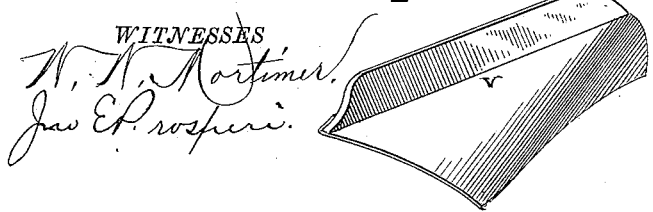
WITNESSES
W. N. Mortimer
Jno. E. Prosperi
INVENTOR
David W. Bovee
by
F. W. Lehmann
Attorney
N. PETERS, Photo-Lithographer, Washington, D. C.

UNITED STATES PATENT OFFICE.

DAVID WILLIAM BOVEE, OF RICHLAND CENTRE, WISCONSIN.

HAY-LOADER.

SPECIFICATION forming part of Letters Patent No. 352,604, dated November 16, 1886.

Application filed September 25, 1885. Serial No. 178,197. (No model.)

*To all whom it may concern:*

Be it known that I, DAVID WILLIAM BOVEE, of Richland Centre, in the county of Richland and State of Wisconsin, have invented certain new and useful Improvements in Hay-Loaders; and I do hereby declare the following to be a full, clear, and exact description of the invention, such as will enable others skilled in the art to which it pertains to make and use it, reference being had to the accompanying drawings, which form part of this specification.

My invention relates to an improvement in hay-loaders; and it consists in, first, the combination of the main teeth of the rake with the auxiliary teeth provided with shoes at their lower ends, and which are placed in the rear thereof, and which act as a stop for the rake when being lowered and prevent the rake-teeth from entering the ground should they be sprung far back by obstructions; second, in the arrangement and combination of parts, which will be more fully described hereinafter.

Figure 1 represents a side elevation of a machine embodying my invention. Fig. 2 is a plan view of the same. Fig. 3 is a perspective of one of the guards. Fig. 4 is an enlarged view of the lower ends of one of the rake and one of the auxiliary teeth.

The elevator-frame consists of the two parts A B, which are hinged together and supported upon suitable wheels, in the usual manner. To these two parts A B is secured the tongue C, by means of which the machine is connected to the wagon upon which the hay is to be loaded. The lower section, B, of the frame is rigidly secured to the main frame of the machine, but the upper section is loosely connected thereto, so that it can be freely adjusted up and down at its upper end, in the usual manner.

In the lower section, B, of the frame is journaled a pulley-shaft, which is driven by a chain which runs from the sprocket-wheels connected to one or both of the supporting-wheels. In the upper end of the section A is also a pulley-shaft, and around these two pulley-shafts is passed the carrier-belt D. The front end of the section A of the frame is supported by the rods or standards E, which have ratchets formed on their upper ends to engage with loops on the frame, thus allowing the upper end of the frame to be adjusted at will.

Rising from the stationary part of the frame are the standards F, and connected to the upper ends of these standards, by means of the metallic braces K, are the two parallel strips G H, to which the teeth are secured. Extending upward from each end of the frame or rake-head is a standard, L, to the upper end of which is connected a handle, M, which has its front free end to pass through a bracket, N, on the upper end of the frame. This handle is provided with stops O, which engage with the said brackets, and serve to retain the tooth-frame in an elevated position when the teeth are not to be brought into operation, or in a lowered position when the rake is in operation.

The rake-teeth P have their upper ends to pass through the strips G, but are fastened to the under side of the strip H by a strip, I, which runs parallel therewith. These rake-teeth are formed from elastic rods bent into the required shape, and which have their ends sharpened, as shown in Fig. 4.

On the rear side of the lower end of each tooth is formed a loop or shoe, R, which has its lower edge to extend slightly below the level of the point of the tooth when in its working position, so as to prevent the point from catching in the ground. These loops R extend upward a suitable distance, and are secured at their upper ends to the rear sides of the teeth, so as to present no point upon which the hay can be caught and retained. The loops or shoes R keep the points of the teeth slightly above the ground when raking light hay; but when heavy hay is encountered the teeth are pressed backward and the points are brought into contact with the surface of the ground, for the purpose of passing under the hay.

There are two or more auxiliary teeth, T, used, which are clamped to the under side of the strips S by means of bolts, which pass up through the holes in the strips. These bolts are adjustable, so that the teeth T can be adjusted longitudinally back and forth, for the purpose of increasing or decreasing the distance between the loops U, into which the lower ends of these teeth T are formed, and the lower ends of the teeth P. The loops U serve as runners to run upon the ground and to prevent any of the hay from catching on the ends. These teeth T prevent the points of the rake-teeth P from entering the ground, when an obstruction of any kind is encountered, by causing the whole rake-head to turn, and thus raising the points of the teeth until the obstruction is passed. When heavy hay is encountered, the points of the teeth P are pressed backward by the weight of the hay until the points of the teeth touch the ground, and thus pass under the hay. The use of the two sets of teeth makes the rake entirely automatic in its operation and adapts it without change to varying circumstances under which it may be brought. The longitudinal adjustment of the auxiliary teeth allows them to be adapted to the rake-teeth, permitting the latter to touch the ground when forced to the rear, or to rest above the same.

To the section B are secured the gatherers V, made widest at their rear ends, and which reach from the inclined standards F back to the end of the frame, and which extend outward over the tops of the rear portions of the wheels, as shown in Fig. 2. Upon the outer edge of each gatherer is formed a vertical flange, which extends from end to end, and which is rounded off at its rear end, so as to offer no impediment to the hay as it is raised upward. The flanges serve to force the hay from the gatherers as it is moved forward upon the elevator. The inner edges of the gatherers are curved downward like the mold-board of a plow, and this curvature increases from the rear end forward, as shown in Fig. 3. While the rear ends of the gatherers are wide enough to receive any hay that may be raised upward, the width of each gatherer rapidly decreases toward their front ends. The outer edges of the gatherers approach the carriers as the space between the rake and carrier increases, and the bottoms of the gatherers twist and curve downward. Should the rake receive the hay in a mass or while bunched, it would clog the machine were it not for the shape of the gatherers, which allow the hay to spread where the space between the rake and carrier is the least and force it toward the carrier as the space increases. The gatherers prevent the hay from falling on the edges of the carrier-belt and clogging its action.

Having thus described my invention, I claim—

1. In a hay-loader, the gatherers V, made widest at their rear and narrowest at their front ends, and provided with vertical flanges along their outer edges, and having their inner edges curved downward, the curvature increasing from their rear ends toward their front ones, substantially as shown.

2. The combination of the rake-teeth with the auxiliary teeth placed in the rear thereof, and provided with loops on their lower ends, substantially as described.

3. The combination of the rake-teeth with the auxiliary teeth placed in the rear thereof, the auxiliary teeth being made longitudinally adjustable in relation to the rake-teeth, substantially as set forth.

In testimony whereof I affix my signature in presence of two witnesses.

DAVID WILLIAM BOVEE.

Witnesses:
WM. CRUIKSHANK,
B. LEWIS BLACKFORD.